United States Patent [19]

Hoffelner

[11] Patent Number: 4,858,868
[45] Date of Patent: Aug. 22, 1989

[54] MOUNTING UNIT WITH ADJUSTABLE LOCKABLE PIVOT ARM

[76] Inventor: Volkwin Hoffelner, Sackgasse 10a, Wördern, Austria, A-3425

[21] Appl. No.: 197,003

[22] Filed: May 20, 1988

[30] Foreign Application Priority Data

May 22, 1987 [AT] Austria .................. 1324/87

[51] Int. Cl.⁴ .............................................. E04G 3/00
[52] U.S. Cl. ..................................... 248/291; 248/284
[58] Field of Search ............... 248/291, 293, 284, 285, 248/286, 287, 278, 178, 185; 116/67 R, 70, 147, 142 FP

[56] References Cited

U.S. PATENT DOCUMENTS

| | | | |
|---|---|---|---|
| 1,342,659 | 6/1920 | Wright | 248/291 |
| 1,730,192 | 10/1929 | Critchfield | 116/142 FP |
| 1,840,768 | 1/1932 | Doane | 248/278 |
| 2,535,586 | 12/1950 | McElroy | 248/291 |
| 2,673,059 | 3/1954 | Lusting | 248/291 X |
| 3,722,393 | 3/1973 | Drevitch | 248/291 X |
| 3,908,950 | 9/1975 | Apel | 248/291 |

Primary Examiner—Ramon O. Ramirez
Attorney, Agent, or Firm—Pennie & Edmonds

[57] ABSTRACT

A mounting unit is disclosed and has an adjustable lockable pivot arm to which a game warning siren or the like may be attached. The mounting unit includes a slide block, a pivot arm and a base plate. The slide block comprises a pivot arm retaining means and a locking means. The pivot arm is attached to and pivots with respect to the pivot arm retaining means. Insertion of the slide block into the base plate provides a locking or clamping effect on the pivot arm thereby preventing inadvertent rotation and reorientation of the pivot arm. Advantageously, the mounting unit and game warning siren are attached to an automobile bumper or fender to warn animals in the path of the automobile of the oncoming automobile.

15 Claims, 4 Drawing Sheets

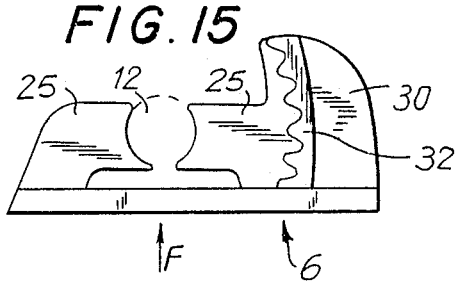
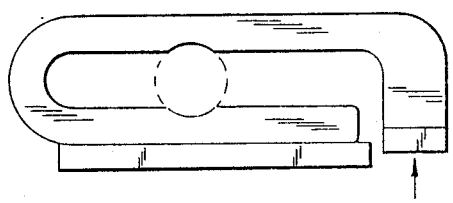
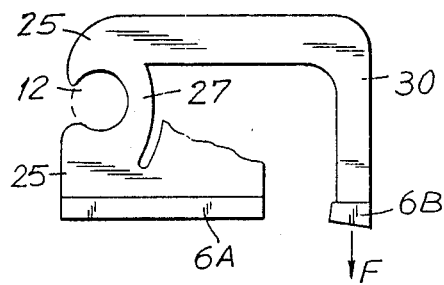
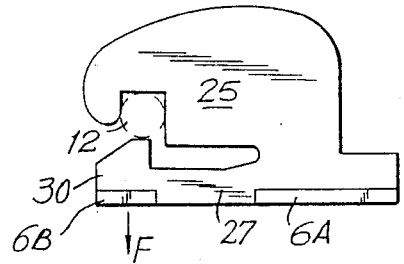

MOUNTING UNIT WITH ADJUSTABLE LOCKABLE PIVOT ARM

TECHNICAL FIELD

This relates generally to an adjustable mounting unit and more particularly to a mounting unit for use with high frequency game warning sirens having an adjustable pivot arm which is securely locked in a desired orientation by a locking means which clamps the pivot arm and prevents rotatio thereof or by the engagement of geared mating portions.

BACKGROUND OF THE INVENTION

High frequency game warning sirens are known in the art. Illustratively, such sirens are mounted to automobiles and, more particularly, to a fender or a front bumper of an automobile. As the car travels, air passes through a siren portion which is suitably geometrically and acoustically configured so as to produce a high frequency sound. Advantageously, such a high frequency sound serves to frighten animals which may be in the path of the oncoming automobile, thereby alerting the animal to the proximity of the automobile and providing the animal an opportunity to escape. As a result, damage to the automobile is prevented. Such damage, especially that caused by large animals, may easily be on the order of thousands of dollars. Furthermore, proper use of high frequency game warning sirens benefits not only the individual whose automobile has been spared a collision, but also the public at large by preserving wildlife and preventing death or injury to domestic animals such as cats, dogs and the like as well as to non-domestic animals. Additionally, personal injury to the occupants of the automobile is prevented.

Unfortunately, known high frequency game warning sirens must be precisely oriented to receive suitable air flow for proper operation and to effectively transmit the high frequency waves. Generally, the central axis of the siren portion must be oriented so as to be parallel to the direction of air flow and pointed towards the likely location of any animals. It is typically desired to mount a game warning siren so as to be horizontal and to receive an unimpeded air flow.

Since high frequency waves are highly directional, any deviation in the orientation of the siren portion will not only reduce incoming air flow but will also profoundly affect the animal's ability to hear the siren. More specifically, inaccurate alignment of the siren portion will inevitably result in the high frequency sound waves radiating upward or downward and thereby not reaching the animal and losing their effect.

Unfortunately, known game warning sirens are not constructed to enable simple adjustment of their orientation relative to the mounting surface. Therefore, a mounting surface of precise inclination and in a suitable location so as to receive unimpeded air flow is necessary for proper orientation of the siren. However, automobiles generally are not provided with such ideal mounting surfaces and thus the effectiveness of the siren is severely diminished.

SUMMARY OF THE INVENTION

The present invention comprises an adjustable mounting unit for use with high frequency game warning sirens and the like. The mounting unit comprises a base plate, a slide block and a pivotably mounted support arm. A siren portion for receiving air flow and emitting high frequency sound waves may be attached to the pivotably mounted support arm.

More specifically, the slide block preferably is bipartite and comprises a pivot arm retaining means which is slidably insertable into the base plate and a locking means which is also slidably insertable into the base plate. The pivot arm retaining means and the locking means are preferably flexibly joined to each other by, for example, a resilient arc for providing flexible movement with respect to each other. The pivotably mounted support arm, or pivot arm, is pivotally attached to and retained by the pivot arm retaining means. By inserting both the locking means and the pivot arm retaining means into the base plate, they are held mutually fixed and cannot flex with respect to each other. The base plate is attached to a mounting surface and preferably has an end stop to limit the insertion of the slide block.

The locking means may comprise a member attached to the pivot arm retaining means directly or by way of the resilient arc. The locking means is preferably provided with a geared portion such as a row of teeth. In such an embodiment, the pivot arm is also provided with a geared portion to matingly engage the geared portion of the locking means. The geared portions are configured such that they are engaged and fixed with respect to each other in the event that the locking means and the pivot arm retaining means are each inserted into the base plate. Additionally, the slide block may be configured such that the geared portions are engaged with each other even if the slide block is not inserted into a base plate. Removal of the locking means and the pivot arm retaining means from the base plate followed by swinging the locking means with respect to the pivot arm retaining means will generally cause the respective gear portions to disengage and separate from each other, thus permitting readjustment and reorientation of the pivot arm which is illustratively attached to a siren portion.

The siren portion may be reoriented subsequent to removal and disengagement by selectively engaging the geared portion of the locking means and the geared portion of the pivot arm and then inserting the slide block and the locking means into the base plate, thereby lockably maintaining the desired orientation.

In an embodiment in which the locking means comprises a geared portion, rotation of the pivot arm is prevented by matingly engaging a geared portion of the pivot arm with the geared portion of the locking means. In such an embodiment, the pivot arm retaining means prevents linear movement of the pivot arm and the locking means prevents rotation of the pivot arm.

In an alternative embodiment, the locking means comprises a movable member which is moved to cause the pivot arm retaining means to exert a sufficient clamping force on a shaft of the pivot arm so as to prevent rotation thereof. In this embodiment, a base plate maintains the movable member in a position in which it causes the pivot arm retaining means to exert sufficient clamping force on a shaft of the pivot arm to prevent rotation thereof. However, in this particular embodiment, the pivot arm must be readjusted each time the slide block is inserted into the base plate as only upon such insertion is there sufficient clamping force exerted to prevent rotation of the pivot arm.

Thus, in order to mount the siren portion and the pivot arm in a desired position, orientation of the siren portion need merely be set in relation to the slide block by selectively pivoting the pivot arm with respect to the slide block, and then inserting the slide block into the base plate. This insertion thus maintains the selected orientation in a fixed manner and fixes the position of the siren portion with respect to the position of the base plate and mounting surface to which it is attached.

Accordingly, it is a principal object of the present invention to provide a new and improved mounting unit.

Another object of the present invention is to provide a mounting unit for a game warning siren in which insertion of a slide block into a base plate maintains the warning siren in a desired orientation.

A further object of the present invention is to provide a game warning siren in which removal of a siren and a slide block from a base plate which is attached to a vehicle will not result in rotation of the siren with respect to the slide block.

Another object of the present invention is to provide a mounting unit for a high frequency game warning siren in which a siren portion is easily configured and adaptable to accommodate a mounting surface having an inclination.

BRIEF DESCRIPTION OF THE DRAWINGS

These and other objects, features and advantages of the invention will become more readily apparent with reference to the following description of the invention in which similar elements are labelled similarly and in which:

FIGS. 8 to 18 depict various embodiments of the slide block, with the pivot arm being additionally indicated in FIGS. 11, 12 and 14.

DETAILED DESCRIPTION OF THE INVENTION

Figure 1:
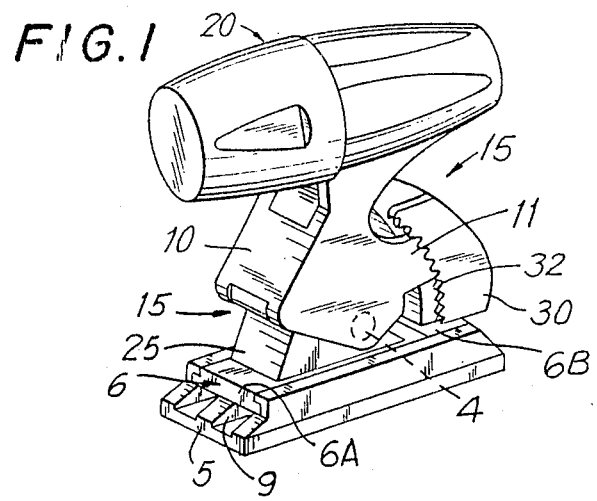
FIG. 1 depicts the mounting unit of the present invention having a siren portion attached thereto.

Referring to FIG. 1, there is shown a preferred embodiment of the inventio comprising a base plate 5, a pivot arm 10 and a bipartite slide block 15. A siren portion 20 for receiving air flow and emitting high frequency sound waves may be attached to the siren base.

Slide block 15 preferably comprises pivot arm retaining means 25 and locking means 30. Pivot arm 10 is provided with a geared, or toothed, portion 11. Shaft 4 is provided on pivot arm 10 for insertion into mating indentations 3 in slide block 15, thereby providing for pivotal movement of pivot arm 10 with respect to slide block 15 about shaft 3. Slide block 15 is provided with a step-shaped portion 6 for insertion into base plate 5. Base plate 5 is preferably provided with a catch (not shown) which prevents unauthorized or inadvertent removal of slide block 15 out of base plate 5. Such catch may be released by introducing a suitable key into channel 9. Base plate 5 is attachable to a mounting surface by use of an adhesive or by insertion of fastening means such as screws into channel 9, through the base plate and into the mounting surface. Base plate 5 is also provided with an end stop to limit insertion of slide block 15 and prevent inadvertent rotation of the pivot arm.

Locking means 30 is provided with a geared, or toothed, portion 32 for matingly engaging geared portion 11 of pivot arm 10. Locking means 30 is preferably connected to and forms an integral part with pivot arm retaining means 25. Pivot arm retaining means 25 and locking means 30 are constructed from any suitable material permitting sufficient relative movement such that locking means 30 may flex away from or with respect to pivot arm retaining means 25 in order to disengage geared portion 11 of pivot arm 10 from geared portion 32 of locking means 30 and enable pivot arm 10 to swing about shaft 4. Locking means 30 is insertable into base plate 5 by way of a step-shaped portion 6B. Advantageously, locking means 30, pivot arm 10 and pivot arm retaining means 25 are configured such that insertion of step-shaed portion 6A of pivot arm retaining means 25 and step-shaped portion 6B of locking means 30 into base plate 5 results in geared portions 12 and 32 becoming matingly engaged and fixed with respect to each other.

More specifically, pivot arm retaining means 25 and locking means 30 are flexibly movable with respect to each other by way of spring action, a flexible arc member, suitably flexible material or the like. Such flexibility permits pivoting and adjusting pivot arm 10 as long as locking means 30 is flexed away from pivot arm retaining means 25 in order to disengage the respective geared portions.

Figure 2:
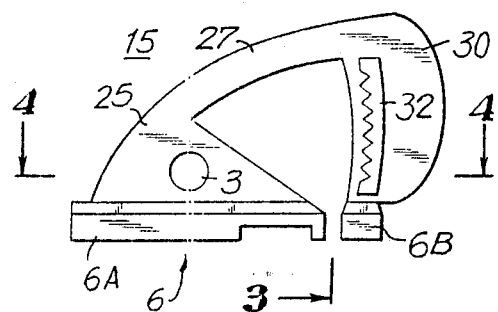
FIG. 2 depicts a slide block of FIG. 1 in detail.

Referring now to FIG. 2, there is depicted a preferred slide block comprising pivot arm retaining means 25 and locking means 30 having geared portion 32. The slide block is provided with step-shaped portion 6 for insertion into a base plate (not shown). More specifically, pivot arm retaining means 25 is provided with step-shaped portion 6A while locking means 30 is provided with step-shaped portion 6B.

As will be appreciated by one skilled in the art, locking means 30 may be flexed away from pivot arm retaining means 25 and, more particularly, step-shaped portion 6B may be flexed in a direction away from step-shaped portion 6A. Such flexing causes flexible arc member 27 of the slide block to bend and geared portion 32 to move approximately radially away from indentations 3 of slide block 15 which serve to receive shaft 4 of pivot arm 10 (not shown). Accordingly, such movement of geared portion 32 will disengage geared portion 32 from geared portion 11 of pivot arm 10, thereby permitting adjustment of pivot arm 10 to a desired orientation. However, once step-shaped portions 6A and 6B are inserted into the base plate, geared portions 32 and 11 are fixedly matingly engaged thereby preventing reorientation of the pivot arm.

Figure 3:
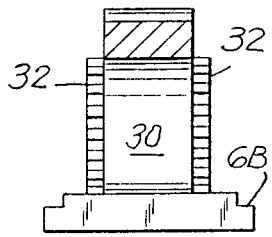
FIG. 3 depicts a section at line 3—3 of FIG. 2.

FIG. 3 depicts a cross-section along line 3—3 of FIG. 2. As is apparent, locking means 30 comprises a plurality, illustratively two, of geared portions 32. Each such geared portion comprises a number of teeth to matingly engage corresponding teeth on geared portion 11 of pivot arm 10.

Figure 4:
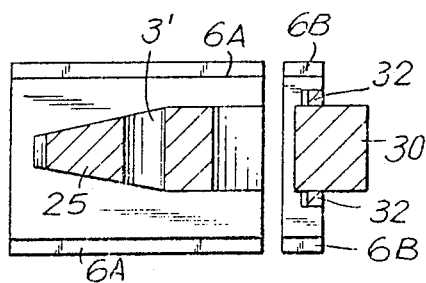
FIG. 4 depicts a section at line 4—4 of FIG. 2.

FIG. 4 depicts a cross-section along line 4—4 of FIG. 4 Illustratively, indentations 3 are depicted as a single bore 3' through pivot arm retaining means 25 of slide block 15. Advantageously, the portion of slide block 15 adapted to receive pivot arm 10 (not shown) is tapered such that the width of the portion of slide block 15 which receives the shaft of the pivot arm 15 decreases in a direction away from locking means 30. This facilitates mounting the pivot arm on slide block 15 and, in particular, on pivot arm retaining means 25, by permitting the gradual sliding of the shaft of the pivot arm along the tapered surface of pivot arm retaining means 25 until the shaft engages bore 3' through pivot arm retaining means 25. In such an embodiment, shaft 4 of pivot arm 10 is in the form of two shaft protrusions or stubs. Once the pivot arm is properly mounted and its shaft inserted into bore 3', geared portion 11 of pivot arm 10 will engge geared portion 32 of locking means 30, fixing the position of the pivot arm relative to the slide block. However, the pivot arm may easily by reoriented by swinging locking means 30 away from pivot arm retaining means 25 thereby causing resilient bridgelike arc member 27 to bend. Once locking means 30 is swung sufficiently far away from pivot arm retaining means 25, the pivot arm may be pivoted and a new orientation chosen. The locking means and pivot arm retaining means may then be released and allowed to move towards each other to their at-rest position, thereby causing the geared portions of the pivot arm and the locking means to engage.

Figure 5:
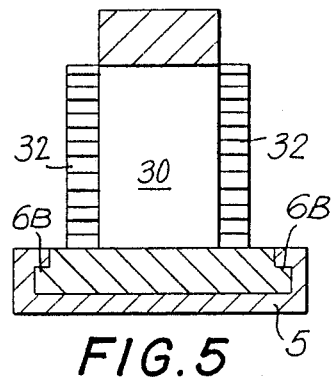
FIG. 5 depicts a sectional view of the slide block inserted in a base plate.

As depicted in FIG. 5, insertion of the engaged assembly comprising the pivot arm and the slide block and, more particularly, insertion of step-shaped portion 6A of the pivot arm retaining means and step-shaped portion 6B of the locking means into the base plate will prevent any further undesired orientation. Preferably, step-shaped portion 6B of the locking means is initially inserted into the base plate, followed by insertion of step-shaped portion 6A of the pivot arm retaining means. Step-shaped portion 6B is inserted into the base plate until an end stop (not shown) within the base plate is contacted at which point further insertion is not possible.

Figure 6:
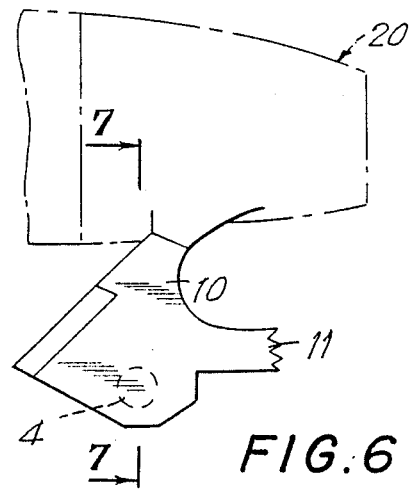
FIG. 6 depicts a partial cross-section of the pivot arm attached to the siren portion with the siren portion indicated in dot-dash lines.

FIG. 6 depicts a partial cross-section of pivot arm 10 with a siren portion 20 indicated by a broken dashed line. Geared portion 11 of pivot arm 10 is provided for matingly engaging geared portion 32 of locking means 30. The siren portion pivots about shaft 4.

Figure 7:
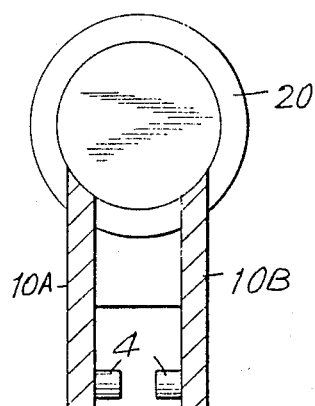
FIG. 7 depicts a section at line 7—7 of FIG. 6.

FIG. 7 depicts a section at line 7—7 of FIG. 6. Pivot arm 10 comprises a first side wall 10A and a second side wall 10B. A siren portion 20 may be attached to pivot arm 10. A shaft 4 comprising two shaft protrusions is provided on an inner surface of first side wall 10A and on an inner surface of second side wall 10B.

With respect to the figures, application of force on the slide block in the direction indicated by arrow F will expand the opening sufficiently to permit insertion and removal of the shaft of the pivot arm into and out of the opening. Additionally, such application of force generally permits reorientation of the pivot arm. Maintaining the step-shaped portions of the slide block in a coplanar orientation such as by inserting the slide block into a base plate will prevent inadvertent rotation of the pivot arm and a siren portion or the like attached thereto.

Figure 8:
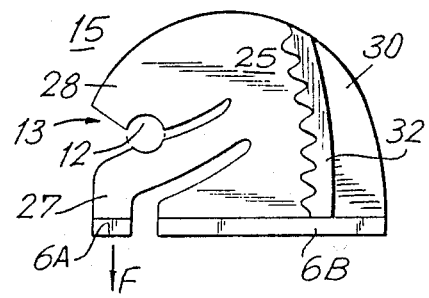

As will be appreciated, a variety of suitable configurations for a slide block are possible and FIGS. 8-18 illustrate some configurations for use with a suitable base plate such as that of FIG. 1. For example, FIG. 8 illustrates a slide block comprising pivot arm retaining means 25 and locking means 30. A shaft of a pivot arm (not shown) is inserted into a partially circular opening 12, thereby causing a geared portion of the pivot arm to matingly engage with geared portion 32 of locking means 30. More specifically, pivot arm retaining means 25 comprises a fixed member 28 and a swingable, i.e., flexible, member 27, defining thereinbetween a channel 13 and partially circular opening 12 for receiving the shaft of the pivot arm. Insertion of the pivot arm into channel 13 will force flexible member 27 downward and enlarge channel 13, thereby permitting the shaft of the pivot arm to enter channel 13 and become lodged in opening 12. Subsequent insertion of the step-shaped portions of the slide block into the base plate and, more particularly, insertion of step-shaped portion 6B of locking means 30 followed by insertion of step-shaped portion 6A of pivot arm retaining means 25 will fixe the position of flexible member 27 with respect to fixed member 28 thereby maintaining the shaft of the pivot arm in opening 12 and resulting in mating engagement of the geared portion of the pivot arm with geared portion 32 of locking means 30. Reorientation is accomplished by removing the slide block from the base plate, at least partially removing the pivot arm by withdrawing it through channel 13 thereby widening channel 13 and flexing flexible member 27 downward, reinserting the pivot arm into opening 12 by way of channel 13 with its geared portion engaging a different part of geared portion 32 of locking means 30 and subsequently inserting the slide block into the base plate to lock the unit in its reoriented position. Advantageously, once the slide block is inserted into the base plate, flexible member 27 is prevented from flexing thereby maintaining opening 12 at its fixed diameter and preventing removal or slippage of the pivot arm out of opening 12.

Figure 9:
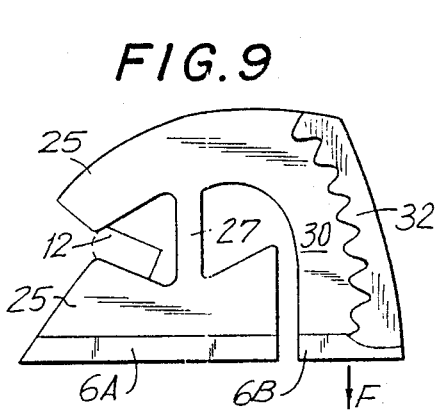

FIG. 9 depicts an alternate embodiment of the slide block comprising pivot arm retaining means 25 and locking means 30. As will be appreciated, a flexible member 27 may be flexed resulting in increasing or decreasing the size of opening 12. A desired orientation is provided by initially flexing flexible member 27 to cause opening 12 to open sufficiently to accept a shaft of a pivot arm, inserting the shaft thereby matingly engaging a geared portion of the pivot arm with a section of geared portion 32 and subsequently inserting the slide block into a base plate. Application of force in a direction opposite to that indicated by arrow F, such as when the slide block is inserted in the base plate, forces the pivot arm in a direction towards geared portion 32 due to urging of the shaft by the tapered wedge-like flank surfaces of pivot arm retaining means 25 surrounding the shaft of the pivot arm.

Figure 10:
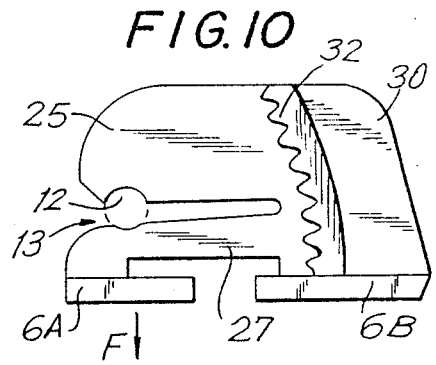

FIG. 10 depicts an alternate embodiment of the slide block comprising pivot arm retaining means 25 and locking means 30. Opening 12 is adapted to receive a shaft of a pivot arm (not shown). Flexible member 27 may be flexed downwards to increase the width of channel 13 and thereby permit the insertion of a shaft of a pivot arm into opening 12 and mating engagement of a geared portio of the pivot arm with geared portion 32 of locking means 30. Insertion of the pivot arm retaining means and locking means into a base plate prevents removal or slippage of the pivot arm out of opening 12.

Figure 11:
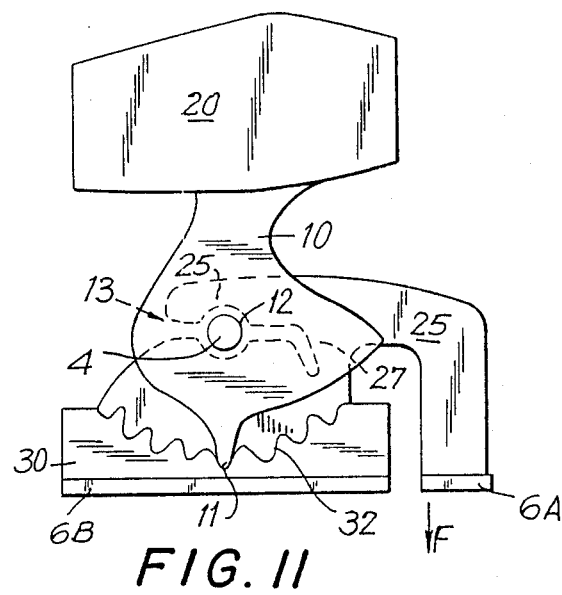

FIG. 11 depicts an alternate embodiment of a slide block and shows a pivot arm 10 having a geared portion 11, illustratively comprising a single tooth, engaging a geared portion 32 of locking means 30. Flexing of flexible member 27 permits increasing and decreasing a width of channel 13 as well as the size of opening 12 for receiving a shaft 4 of pivot arm 10. Insertion of the slide block comprising locking means 30 and pivot arm retaining means 25 into a base plate prevents removal or slippage of hte pivot arm out of opening 12.

Figure 12:
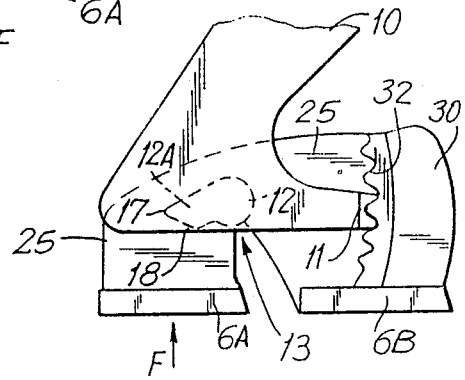

FIG. 12 depicts an alternate embodiment and shows a pivot arm 10 having a geared portion 11 engaging a geared portion 32 of locking means 30. An opening 12 is provided in which the shaft of pivot arm 10 is maintained in the event that the slide block is inserted in a base plate. Additionally, an opening 12A at least partially defined by tapered wedge-like flank surfaces 17 and 18 is provided into which the shaft is initially inserted as channel 13 is maintained in a widened width. As will be appreciated by one skilled in the art, insertion of the slide blick into a base plate will narrow the width of channel 13 from its widened width to a more narrow width thereby causing surfaces 17 and 18 to move towards eachother forcing the shaft from opening 12a into opening 12 and matingly engaging geared portion 11 with geared portion 32. Advantageously, rotation of the pivot arm is prevented even if the slide block is not inserted in a base plate as flank surfaces 17 and 18 will urge the geared portion of the pivot arm against the geared portion of the locking means.

Figure 13:
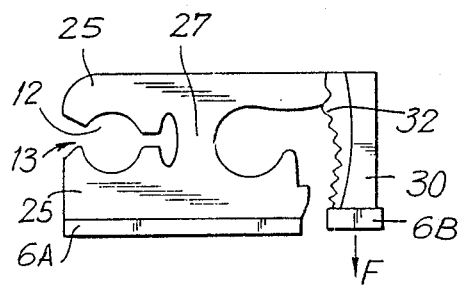

FIG. 13 depicts an alternate embodiment of a slide block comprising locking means 30 and pivot arm retaining means 25. An opening 12 is provided for receiving a shaft of a pivot arm (not shown) by way of channel 13. Flexing flexible member 27 appropriately will either increase or decrease the size of opening 12. Suitably increasing the size of opening 12 and the width of channel 13 will accommodate the insertion of the shaft into opening 12. Upon insertion of the shaft into opening 12 and mating engagement of the geared portions of the pivot arm and the locking means, flexible member 27 may be flexed towards its at-rest position in which step-shaped portion 6B of locking means 30 is approximately coplanar with step-shaped portion 6A of pivot arm retaining means 25. Insertion of the slide block into a base plate will maintain the shaft of the pivot arm firmly in opening 12 and the respective geared portions matingly engaged.

Figure 14:
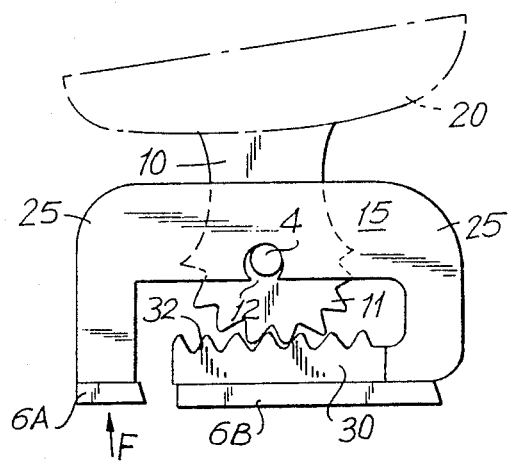

FIG. 14 depicts an alternate embodiment of a slide block comprising locking means 30 and pivot arm retaining means 25. Pivot arm 10 having geared portion 11 and shaft 4 is depicted inserted into opening 12 and engaged with geared portion 32 of locking means 30. Application of force in the direction indicated by arrow F will permit insertion of the shaft of the pivot arm into opening 12 as well as reorientation of the pivot arm.

FIG. 15 depicts an alternate embodiment of a slide block comprising locking means 30 and pivot arm retaining means 25 in which a single step-shaped portion 6 is inserted into a base plate. A region of the step-shaped portion in the area indicated by arrow F is sufficiently flexible such that application of force in the direction indicated by arrow F with expand opening 12 sufficiently to permit insertion of a shaft therein. Simultaneously with such insertion, a geared portion of the pivot arm is matingly engaged with geared portion 32 of locking means 30.

As will be appreciated by one skilled in the art, geared portions are not necessary for proper operation of the invention. For example, a clamping mechanism which exerts sufficient force on the shaft to prevent rotation thereof may be employed.

FIGS. 16, 17 and 18 depict embodiments of the invention which exert sufficient force on a shaft of a pivot arm to prevent rotation thereof without the need for geared portions. More specifically, FIG. 16 depicts a slide block comprising pivot arm retaining means 25 for holding a pivot arm and locking means 30 for supplying sufficient force to the pivot arm in order to prevent inadvertent rotation of the pivot arm. Application of force in the direction indicated by arrow F will expand opening 12 sufficiently to permit insertion of a shaft of the pivot arm into the opening as well as reorientation of the pivot arm. Insertion of step-shaped portion 6B of the locking means and step-shaped portion 6A of the pivot arm retaining means into a base plate will exert sufficient force on the shaft to prevent inadvertent rotation of the pivot arm.

FIG. 17 depicts a slide block comprising pivot arm retaining means 25 having step-shaped portion 6A and locking means 30 having step-shaped portion 6B. As will be appreciated, application of force in the direction indicated by arrow F will result in flexing flexible member 27 and enlarging opening 12 to receive or adjust the orientation of a pivot arm.

FIG. 18 depicts a slide block comprising pivot arm retaining means 25 having step-shaped portion 6A and locking means 30 having step-shaped portion 6B. Application of force in the direction indicated by arrow F will result in flexing flexible member 27 and enlarging opening 12. A shaft of a pivot arm is maintained in opening 12 by three sides of opening 12 which are formed by three faces of pivot arm retaining means 25 and a single face of locking means 30.

Thus it can be seen that there is provided an improved mounting unit in which a slide block comprising a locking means and a pivot arm retaining means connected thereto prevents inadvertent rotation and reorientation of the pivot arm and is easily adapted for mounting onto surfaces having a wide range of inclination. In addition, it is to be understood that the invention can be carried out by specifically different equipment and devices and that various modifications, both as to equipment details and operating procedures can be effected without deparing from the spirit and scope of the claimed invention.

More specifically, the claimed invention is not limited to any particular size or shape opening to accommodate the shaft of the pivot arm, nor is the invention limited to any specific configuration to locking means and pivot arm retaining means. Furthermore, an at-rest configuration of the pivot arm and the slide block in which the slide block is not inserted into the base plate may maintain the pivot arm in a locked or clamped position thereby preventing rotation of the pivot arm. Alternatively, such an atrest configuration may maintain the pivot arm unlocked or unclamped thereby permitting rotation of the pivot arm. In any case, insertion of the slide block into the base plate will prevent rotation of the pivot arm.

What is claimed is:

1. A mounting unit for mounting a game warning siren to a mounting surface comprising:
    a base plate attachable to said mounting surface;
    a pivot arm for attachment to said siren; and
    a bipartite slide block having a pivot arm retaining means for retaining said pivot arm and a locking means for preventing rotation of said pivot arm, said pivot arm being pivotably mounted to said pivot arm retaining means;
    wherein said locking means is elastically swingable with respect to said pivot arm retaining means and wherein slidable insertion of said slide block into said base plate fixes the position of said pivot arm retaining means with respect to said locking means and prevents rotation of said pivot arm.

2. The mounting unit of claim 1 wherein said pivot arm is mountd to said pivot arm retaining means in a region adjacent to said locking means and insertion of said slide block into said base plate produces tension in said slide block.

3. The mounting unit of claim 1 wherein said locking means is provided with a first geared portion and said pivot arm is provided with a second geared portion for mating engagement with said first geared portion of said locking means.

4. The mounting unit of claim 3 wherein said pivot arm retaining means inserted into said base plate urges said pivot arm against said locking means and matingly engages said second geared portion of said pivot arm with said first geared portion of said locking means.

5. The mounting unit of claim 1 wherein said pivot arm retaining means of said slide block inserted into said base plate clamps a shaft of said pivot arm thereby preventing rotation of said pivot arm.

6. The mounting unit of claim 5 wherein force applied by said locking means to said pivot arm retaining means as a result of insertion of said locking means into said base plate clamps said shaft.

7. The mounting unit of claim 1 wherein said base plate is provided with an end stop to limit insertion of said slide block.

8. A mounting unit for mounting a game warning siren to a mounting surface comprising:
a pivotably mounted support arm attachable to said siren;
a bipartite slide block adapted to pivotably receive said pivotably mounted support arm;
means for fixing said pivotably mounted support arm with respect to said slide block in a preassigned position and comprising a first geared portion on said support arm and a second mating geared portion on said slide block wherein said support arm and said slide block are elastically displaceable in a direction to engage and disengage said first geared portion from said second geared portion; and
means for affixing said slide block to said mounting surface.

9. The mounting unit of claim 8 wherein said means for fixing said support arm comprises clamping means for clamping a shaft of said support arm.

10. The mounting unit of claim 8 wherein said means for affixing said slide block comprises an adhesive.

11. The mounting unit of claim 8 wherein said means for affixing said slide block comprises a base plate into which said slide block is insertable.

12. The mounting unit of claim 11 wherein said base plate is mounted to said mounting surface.

13. A high frequency game warning siren mountable on a motor vehicle for use in warning animals of oncoming vehicles comprising:
a siren portion geometrically and acoustically configured so as to produce a high frequency sound upon the passage of air therethrough;
a pivot arm attached at a first end to said siren;
a bipartite slide block having a pivot arm retaining means for retaining said pivot arm and a locking means for preventing rotation of said pivot arm;
wherein said bipartite slide block is provided with an opening at least partially therethrough, said opening adapted to receive a shaft of said pivot arm wherein said locking means comprises a geared portion attached to said pivot arm and a geared portion attached to said slide block, said geared portions matingly engaging each other when said slide block is inserted into said base plate, thereby preventing rotation of said pivot arm and said siren; and
a base plate attachable to said motor vehicle, said slide block being insertable into said base plate.

14. The high frequency game warning siren of claim 13 wherein said opening has a diameter adjustable in accordance with force applied to said locking means.

15. The high frequency game warning siren of claim 13 wherein said locking means comprises a movable member which causes a diameter of said opening to decrease and a surface defining said opening to contact said shaft of said pivot arm with sufficient force to prevent rotation thereof.

* * * * *